United States Patent
Chu et al.

(10) Patent No.: US 8,208,604 B1
(45) Date of Patent: Jun. 26, 2012

(54) SYSTEMS AND METHODS FOR DIAGNOSING ANOMALIES ALONG BONDED LOOP COMMUNICATION MEDIA

(75) Inventors: Fred Chu, Madison, AL (US); Philip David Williams, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 1157 days.

(21) Appl. No.: 12/037,716

(22) Filed: Feb. 26, 2008

(51) Int. Cl.
- *H04M 1/24* (2006.01)
- *H04M 3/08* (2006.01)
- *H04M 3/22* (2006.01)

(52) U.S. Cl. .................................................. 379/22.03
(58) Field of Classification Search ................. 379/22.03
See application file for complete search history.

(56) References Cited

U.S. PATENT DOCUMENTS

| | | | | |
|---|---|---|---|---|
| 4,438,511 | A * | 3/1984 | Baran ........................... | 370/204 |
| 6,975,706 | B1 | 12/2005 | Joffe et al. | |
| 7,023,963 | B1 | 4/2006 | Chu et al. | |
| 7,174,488 | B1 | 2/2007 | Chu | |
| 7,460,498 | B2 | 12/2008 | Hunt et al. | |
| 2002/0080924 | A1* | 6/2002 | Petrillo et al. ............. | 379/27.07 |
| 2004/0114729 | A1* | 6/2004 | Rude ................................. | 379/3 |
| 2008/0205501 | A1* | 8/2008 | Cioffi et al. ................... | 375/224 |

* cited by examiner

*Primary Examiner* — Alexander Jamal
(74) *Attorney, Agent, or Firm* — Lanier Ford Shaver & Payne, P.C.; Jon E. Holland (57) ABSTRACT

The present disclosure generally pertains to systems and methods for diagnosing loop anomalies for bonded-loop communication media. In one exemplary embodiment of the present disclosure, a communication medium comprises a plurality of bonded loops that couple network communication equipment (e.g., communication equipment at a central office) to customer premises (CP) communication equipment residing at a customer premises. If communication occurring over one of the loops becomes significantly degraded (e.g., if the SNR of the loop falls below a predefined threshold or id communication across the loop is interrupted), then loop diagnostic logic at the customer premises performs a diagnostic test on the loop. Information indicative of the diagnostic test is then communicated to the network equipment via one of the other bonded loops. Thus, the network service provider is able to receive information indicative of the diagnostic test without having to send a technician to the customer premises.

23 Claims, 6 Drawing Sheets

SYSTEMS AND METHODS FOR DIAGNOSING ANOMALIES ALONG BONDED LOOP COMMUNICATION MEDIA

RELATED ART

In a telecommunication system, communication media often comprise at least one pair of conductive wires, sometimes referred to as a "loop" or "subscriber loop." Such conductive wires can be twisted in which case the wire pair is referred to as a "twisted pair." One wire of a subscriber loop is often referred to as "tip," and the other wire is often referred to as "ring." A subscriber loop typically extends from a central office (CO) of a telecommunication network to a customer premises (CP). Equipment, such as a modem, at the CO communicates across the subscriber loop with equipment, such as a modem, at the CP.

In some cases, a plurality of subscriber loops are bonded to form a data channel with increased bandwidth between the CO and CP. When multiple loops are bonded, bonding logic at the CP and CO distribute data across the bonded loops thereby enabling the data channel to have a higher data rate than would otherwise be possible with only a single loop. The bonding logic may divide a data stream across the bonded loops so that each loop transmits a portion of the data stream, or the bonding logic may transmit in one direction across a set of the bonded loops and transmit in the opposite direction across the other bonded loops. In either case, the throughput of the channel can be increased by using a plurality of bonded loops instead of a single loop.

As a signal propagates along a subscriber loop, the signal is attenuated, and noise from a variety of sources interferes with the signal thereby degrading the quality of the signal being communicated. A common parameter for quantifying signal quality is the signal-to-noise ratio (SNR). To determine a signal's SNR, the signal is sampled and analyzed to determine the amount of noise in each sample. The SNR is then determined by dividing a value indicative of the measured signal strength to a value indicative of the measured noise. In general, a higher SNR indicates better signal quality, and a lower SNR indicates worse signal quality.

Various types of anomalies may occur along a subscriber loop degrading or disrupting the signals propagating along the loop. For example, a construction crew or some other party may accidentally sever a subscriber loop thereby preventing signals from being communicated between the CO equipment and the CP equipment. Furthermore, in many cases, a subscriber loop comprises several line segments that have been spliced together. A splice along the subscriber loop may degrade thereby increasing the total loop resistance. Such an anomaly may significantly degrade signal quality. In another example, tip and ring may be shorted at any point along the loop. Various other types of anomalies causing a reduction in signal quality may occur along a subscriber loop.

Unfortunately, diagnosing a loop anomaly can be difficult and problematic, particularly considering that many subscriber loops extend over long distances, such as on the order of a few miles, and are sometimes buried or otherwise positioned in hard to reach locations. In an effort to assist with loop diagnosis, several loop diagnostic tools have been developed. Such tools are capable of automatically analyzing a loop in an effort to detect and/or locate an anomaly that is causing degraded communication performance or preventing communication altogether. In this regard, equipment for diagnosing a loop anomaly typically transmits a test signal along the loop under test and measures the test signal's reflections. Anomalies in the test signal reflections can indicate the presence of a loop anomaly and, in some cases, the distance of the anomaly from the test equipment and/or the anomaly type can be determined.

Moreover, when communication performance becomes significantly degraded (e.g., when the SNR of a loop falls below a predefined threshold or when communication across the loop is interrupted), loop diagnostic equipment at the central office attempts to locate an anomaly that may be degrading the loop's performance. If a loop anomaly is located, a technician may be dispatched to the location of the anomaly in an attempt to restore and/or repair the loop. Typically, the process of detecting and reporting the location of the anomaly is automatic.

Unfortunately, the loop diagnostic equipment at the central office is not always capable of locating an anomaly that is causing degraded communication performance. In this regard, the test signals used by the loop diagnostic equipment are susceptible to the attenuation and noise problems described above. Generally, the further an anomaly is located from the central office, the more difficult it is for the loop diagnostic equipment to diagnose the anomaly (e.g., determine the anomaly's location and/or type). Thus, for many anomalies, particularly for anomalies located close to the customer premises, the loop diagnostic equipment may be unable to diagnose the anomaly. Moreover, in such cases, a telecommunication service provider may send a technician to the customer premises in order to run a loop diagnostic test at the customer premises. Such a test may be more likely to diagnose at least some anomalies, particularly ones close to the customer premises. However, sending a technician to a customer premises, sometimes referred to as a "truck roll," is burdensome and costly, and it is generally desirable for a telecommunication service provider to limit or reduce truck rolls.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for diagnosing loop faults and/or other types of anomalies along bonded-loop communication media. In one exemplary embodiment of the present disclosure, a communication medium comprises a plurality of bonded loops coupling central office (CO) network communication equipment to customer premises (CP) communication equipment residing at a customer premises. If communication occurring over one of the loops becomes significantly degraded (e.g., if the SNR of the one loop falls below a predefined threshold or if communication across the loop is interrupted), then loop diagnostic logic at the CP performs a diagnostic test on the loop. Information indicative of the diagnostic test is then communicated to the CO network equipment via one of the other bonded loops. Thus, the network service provider is able to receive information indicative of the diagnostic test without having to send a technician to the customer premises.

Figure 1:
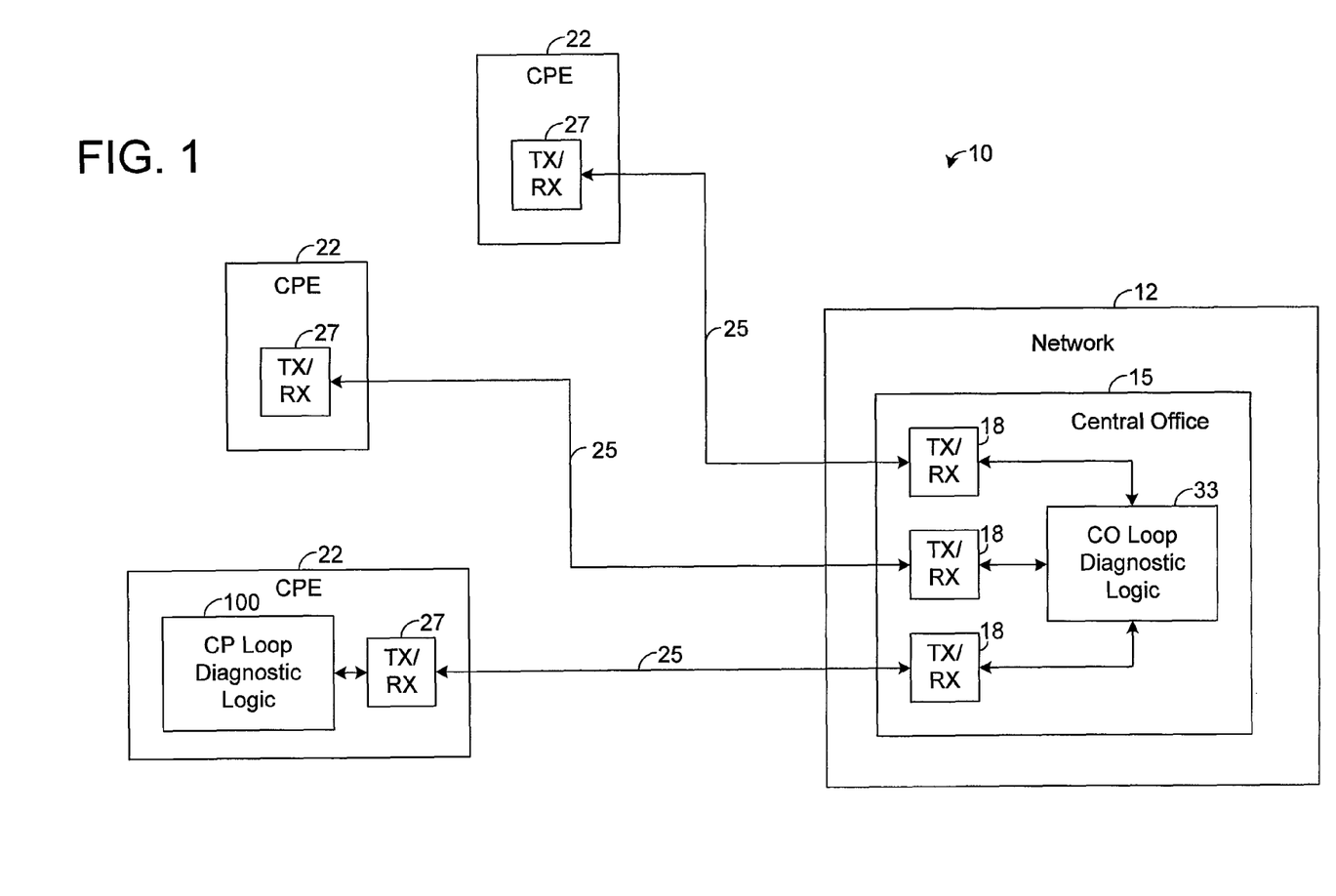
FIG. 1 is a block diagram illustrating an exemplary embodiment of a communication system in accordance with the present disclosure.

FIG. 1 depicts an exemplary embodiment of a telecommunication system 10. The system 10 comprises a communication network 12, such as the public switched telephone network (PSTN). The network has a central office (CO) 15 where a plurality of transceivers 18 are located. As known in the art, the term "central office" generally refers to a central site where telecommunication lines are connected to network communication equipment. Each transceiver 18 is respectively coupled to and communicates with customer premises (CP) equipment 22 located at a remote site. In this regard, each CO transceiver 18 is coupled to a respective communication medium 25, which extends from the CO transceiver 18 to a CP transceiver 27 residing at a customer premises. Each communication medium 25 comprises at least one pair of conductive wires. Various types of known or future-developed protocols, such as asymmetric digital subscriber line (ADSL), high-bit-rate digital subscriber line (HDSL), HDSL2, HDSL4, etc., may be used to communicate data across any of the communication media 25. Any of the media 25 can comprise any number of wire pairs, referred to as "loops."

As shown by FIG. 1, CO loop diagnostic logic 33 is coupled to at least one of the CO transceivers 18. The logic 33 can be implemented in hardware, software, or a combination thereof. In one exemplary embodiment, as shown by FIG. 2, the CO loop diagnostic logic 33 is implemented software and stored in memory 36 of a data processing system 38.

Note that the loop diagnostic logic 33, when implemented in software, can be stored and transported on any computer-readable medium for use by or in connection with an instruction execution apparatus that can fetch and execute instructions. In the context of this document, a "computer-readable medium" can be any means that can store a program for use by or in connection with an instruction execution apparatus.

Figure 2:
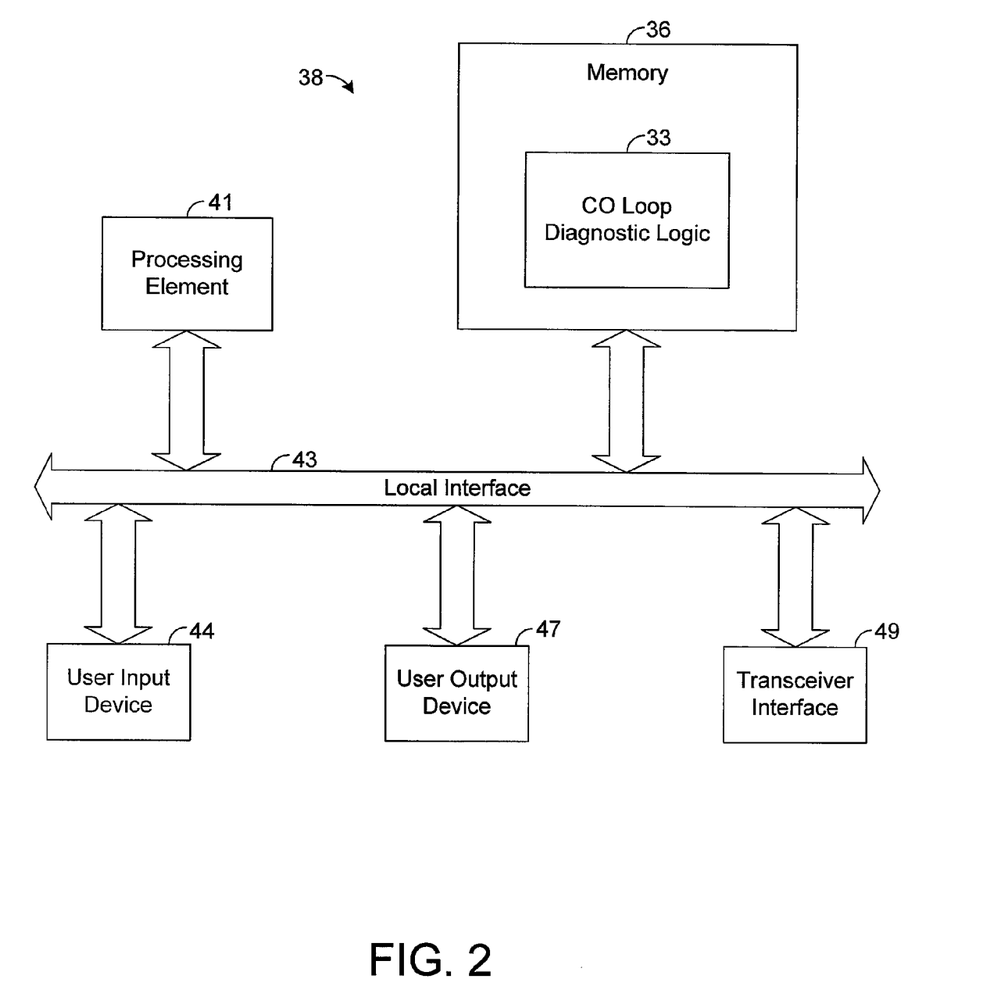
FIG. 2 is a block diagram illustrating an exemplary embodiment of a data processing system implemented in a communication network, such as is depicted by FIG. 1.

The exemplary embodiment of the data processing system 38 depicted by FIG. 2 comprises at least one conventional processing element 41, such as a central processing unit (CPU), that communicates to and drives the other elements within the system 38 via a local interface 43, which can include at least one bus. As an example, the processing element 41 may execute portions of the CO loop diagnostic logic 33, if any, implemented in software.

Furthermore, a user input device 44, such as a keyboard, keypad, or mouse, allows a user to input data to the system 38, and a user output device 47, such as a display unit or a printer, allows the system 38 to output data to a user. Note that the links coupling the devices 44, 47 to the logic 33 may be wired or wireless. In addition, the devices 44, 47 may reside at a site remote from that of the logic 33, if desired. The system 38 also comprises a transceiver interface 49 that is coupled to the CO transceivers 18 to allow communication between at least one of the transceivers 18 and the CO loop diagnostic logic 33.

Referring to FIG. 1, when the data communication occurring across any of the communication media 25 becomes significantly degraded, the CO loop diagnostic logic 33 is configured to perform a diagnostic test on the defective communication medium 25 in an effort to determine the cause of the degradation. For example, communication occurring across one of the media 25 may become degraded due to a loop anomaly, such as a severed wire pair or a degraded splice. In one exemplary embodiment, in an effort to diagnose a loop anomaly, the loop diagnostic logic 33 analyzes data indicative of the echoes of a signal transmitted across the degraded medium 25. As known in the art, "echoes" refer to portions of a transmitted signal that are reflected by a communication medium back toward the signal's transmitter. Note that the transmitted signal may be of various types, such as a data signal transmitted in the ordinary course of communication between transceivers 18, 27 or a test signal that is generated primarily for the purpose of testing the degraded medium 25.

In some cases, particularly if a loop anomaly is located close to the central office 15, the logic 33 is able to diagnose the loop anomaly (e.g., determine its distance from the central office 15 and/or its type) based on the echoes of the transmitted signal. For example, if an echo canceler is employed, the tap coefficients of the echo canceler, which are based on the received echoes, may be analyzed to diagnose the loop anomaly. Exemplary techniques for diagnosing loop faults or other types of anomalies along communication media are described in the following patent publications: U.S. Pat. No. 7,174,488, entitled "Echo Canceler-Based Mechanism for Performing and Reporting Fault Diagnostic Testing of Repeatered Telecommunication Line," and issued on Feb. 6, 2007, which is incorporated herein by reference; U.S. Pat. No. 7,023,963, entitled "DLS Line Card Echo Canceler-Based Mechanism for Locating Telecommunication Line Fault," and issued on Apr. 4, 2006, which is incorporated herein by reference; U.S. Pat. No. 6,975,706, entitled "Capacitance Measurement-Based Mechanism for Locating Open Telecommunication Line Fault," and issued on Dec. 13, 2005, which is incorporated herein by reference; and U.S. Patent Pub. No. 20050123031, entitled "System and Method for Detecting Anomalies Along Telecommunication Lines," and filed on Dec. 4, 2003, which is incorporated herein by reference. If the logic 33 is able to diagnose a loop anomaly, then the logic 33 preferably reports the results of the diagnostic test via the user output device 47 (FIG. 2) or otherwise.

Figure 3:
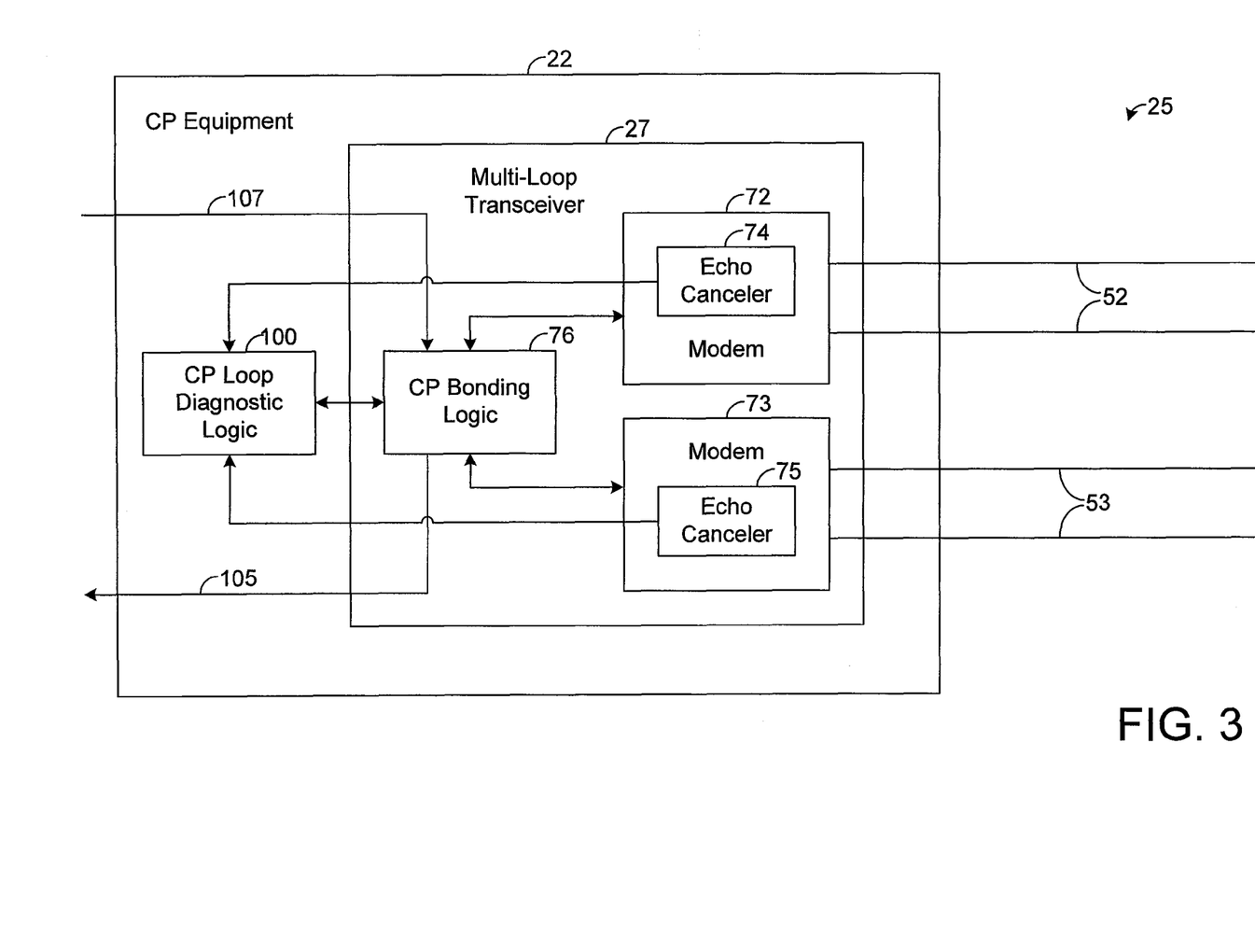
FIG. 3 is a block diagram illustrating an exemplary embodiment of a customer premise (CP) end of a multi-loop communication medium, such as is depicted by FIG. 1.
Figure 4:
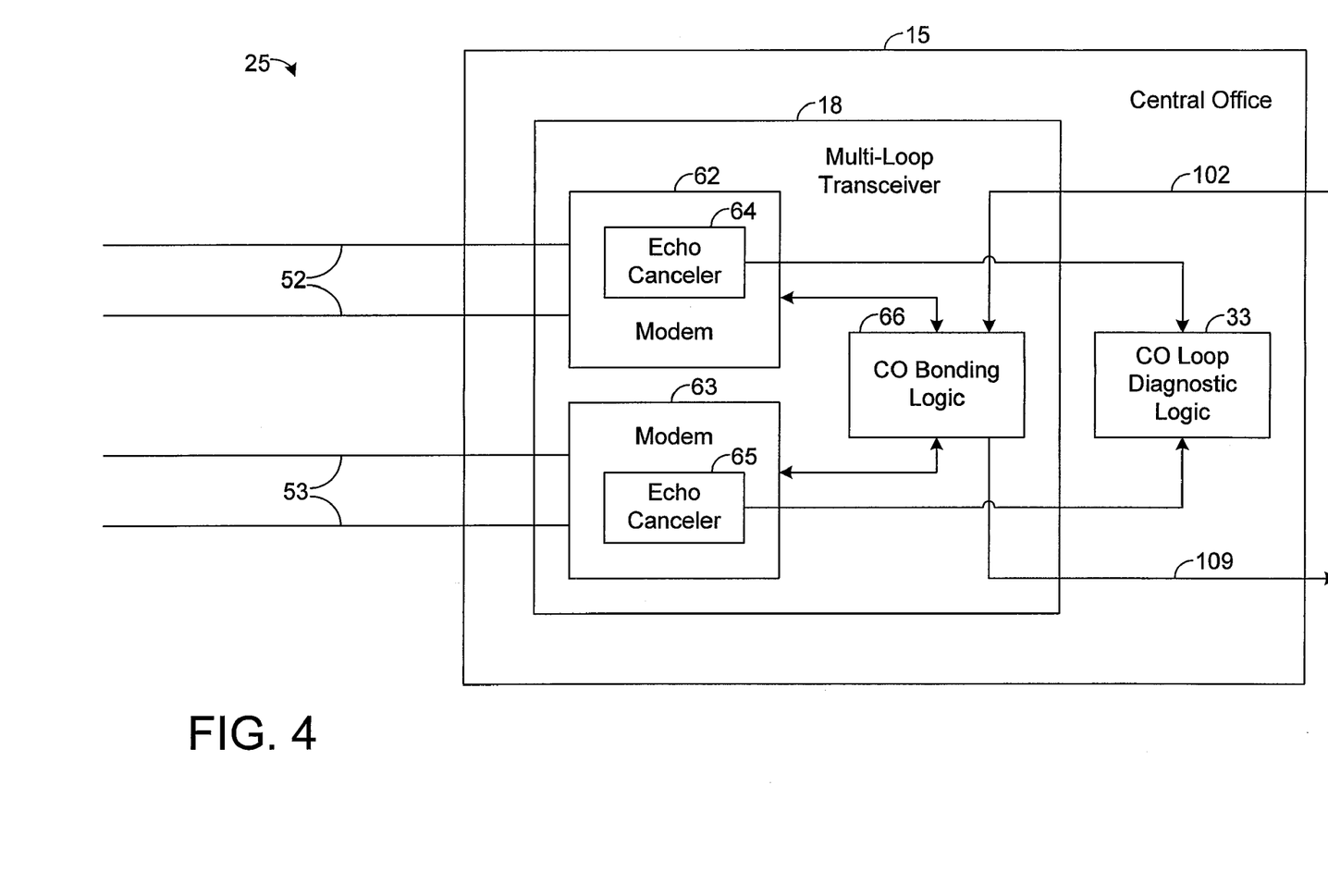
FIG. 4 is a block diagram illustrating an exemplary embodiment of a central office (CO) end of a multi-loop communication medium, such as is depicted in FIG. 3.

FIGS. 3 and 4 depict an exemplary multi-loop communication medium 25. The medium 25 is coupled at one end to a CO transceiver 18 at the CO 15 and at the opposite end to a CP transceiver 27 at a CP. The exemplary medium 25 shown by FIGS. 3 and 4 has two bonded loops 52, 53, but a greater number of bonded loops are possible in other embodiments. The loops 52, 53 are preferably bound within a cable (not specifically shown). The transceivers 18, 27 coupled to the multi-loop medium 25 are referred to as "multi-loop transceivers," and each of the multi-loop transceivers 18, 27 is configured to communicate across both of the loops 52, 53.

Note that various configurations of the transceivers 18, 27 are possible, and various techniques may be used to communicate data over the loops 52, 53. In one exemplary embodiment, the transceivers 18, 27 communicate in accordance with DSL protocols (e.g., ADSL, HDSL, HDSL2, HDSL 4, etc.), but other protocols are possible in other embodiments.

As shown by FIG. 4, each of the loops 52, 53 is coupled to a respective modem 62, 63 of the CO transceiver 18. Each modem 62, 63 preferably has a respective echo canceler 64, 65 for canceling echoes received from the loop 52, 53 that is coupled to it. In addition, each modem 62, 63 is coupled to CO bonding logic 66, which can be implemented in hardware, software, or a combination thereof. When implemented in software, the CO bonding logic 66 can be stored and transported on any computer-readable medium. The bonding logic 66 generally controls the operation of both modems 62, 63.

In one exemplary embodiment, the bonding logic 66 receives, from other components of the central office 15, a CO data stream 102 to be transmitted to the CP equipment 22 that is coupled to the communication medium 25 shown by FIGS. 3 and 4. The CO bonding logic 66 divides the CO data stream 102 such that a portion of the data stream 102 is transmitted by the modem 62 across the loop 52 and that the remainder of the data stream 102 is transmitted by the modem 63 across the loop 53. The CO data stream 102 may be communicated differently in other embodiments (e.g., via different numbers of modems and loops).

Data transmitted by the modem 62 across the loop 52 is received by a modem 72 (FIG. 3) of the CP transceiver 27. Further, data transmitted by the modem 63 across the loop 53 is received by the modem 73 of the CP transceiver 27. As shown by FIG. 3, the modems 72, 73 respectively employ an echo canceler 74, 75 similar to CO modems 62, 63. In addition, the modems 72, 73 are coupled to CP bonding logic 76, which can be implemented in hardware, software, or a combination thereof. When implemented in software, the CP bonding logic 76 can be stored and transported on any computer-readable medium. The CP bonding logic 76 combines the data received by the modems 72, 73 from the loops 52, 53, respectively, in order to recover the CO data stream 102 (FIG. 4) originally divided by the CO bonding logic 66, and the CP bonding logic 76 transmits this recovered data stream 105 to other equipment at the CP 22.

Similarly, a CP data stream 107 to be transmitted to the central office 15 is divided by the CP bonding logic 76 and recovered by the CO bonding logic 66. In this regard, the transceiver 27 is coupled to various other CP equipment (not specifically shown), such as a computer, a fax machine, a telephone, etc., and receives data from such other CP equipment. The data from multiple devices may be combined to form the CP data stream 107 for transmission to the central office 15. Upon receiving the CP data stream 107, the CP bonding logic 76 divides such stream 107 and transmits a portion of the stream 107 to one modem 72 for transmission across one loop 52. Further, the bonding logic 76 transmits the remainder of the CP data stream 107 to the other modem 73 for transmission across the other loop 53. Upon receiving such data, the CO bonding logic 66 combines the data transmitted across loop 52 with the data transmitted across loop 53 to recover the CP data stream originally divided by the bonding logic 76, and the CO bonding logic 66 transmits this recovered data stream 109 to other equipment at the CO 15. Note that other numbers of modems and loops may be used to communicate the CO data stream 107.

Moreover, by splitting a data stream for simultaneous communication across both loops 52, 53, the loops are referred to as being "bonded." The concept of and techniques for bonding multiple loops are generally well-known, and a further description of various bonding techniques that may be employed by the bonding logic 66, 76 will not be provided herein for brevity purposes.

Figure 5:
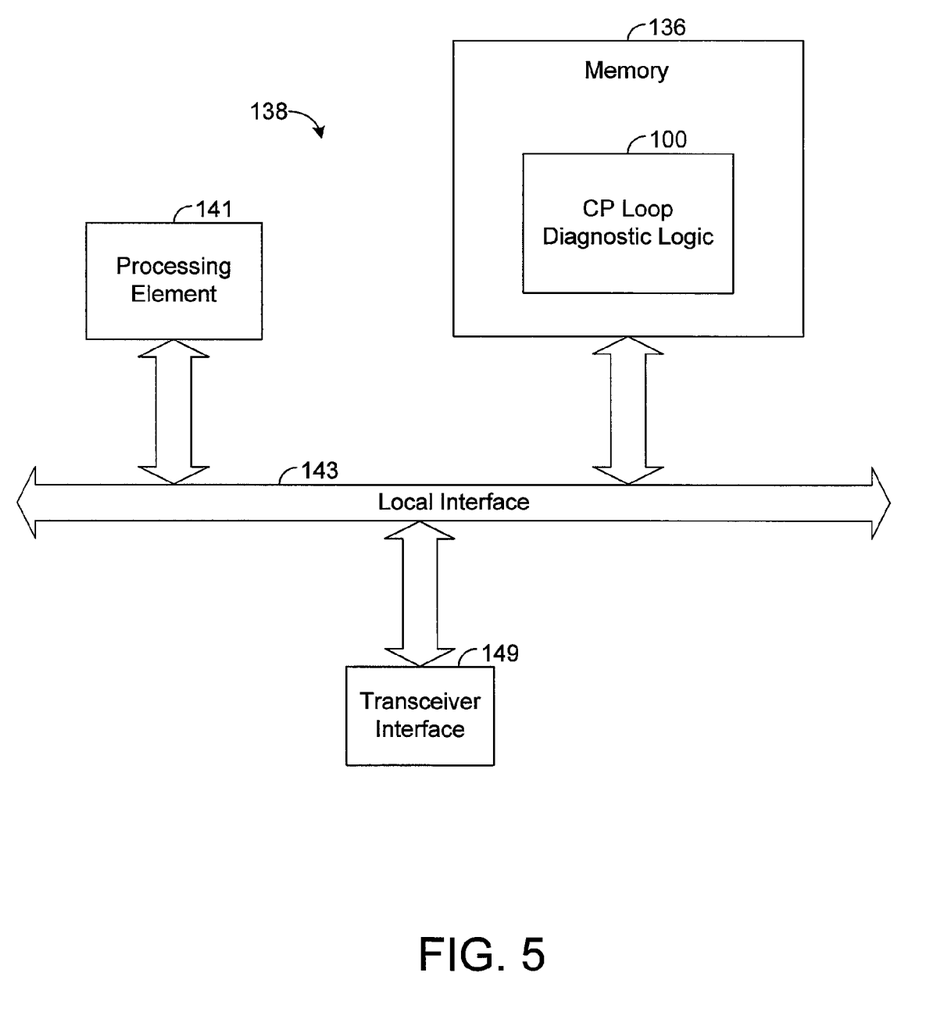
FIG. 5 is a block diagram illustrating an exemplary embodiment of a data processing system implemented in CP equipment depicted by FIG. 3.

As shown by FIG. 3, the CP equipment 22 comprises CP loop diagnostic logic 100, which can be implemented in hardware, software, or a combination thereof. In one exemplary embodiment, as shown by FIG. 5, the CP loop diagnostic logic 100 is implemented in software and stored in memory 136 of a data processing system 138. Note that the loop diagnostic logic 100, when implemented in software, can be stored and transported on any computer-readable medium for use by or in connection with an instruction execution apparatus that can fetch and execute instructions.

The exemplary embodiment of the data processing system 138 depicted by FIG. 5 comprises at least one conventional processing element 141, such as a central processing unit (CPU), that communicates to and drives the other elements within the system 138 via a local interface 143, which can include at least one bus. As an example, the processing element 141 may execute portions of the CP loop diagnostic logic 100, if any, implemented in software. Furthermore, the system 138 also comprises a transceiver interface 149 that is coupled to components of the CP transceiver 27 to allow communication between such components (e.g., hardware) and the CP loop diagnostic logic 100. Note that software portions, if any, of the transceiver 27 may be stored in memory 136 and executed by the processing element 141, if desired.

When desired, the loop diagnostic logic 100 tests at least one of the loops 52, 53 in an attempt to diagnose a loop anomaly. Techniques similar those described above for the CO loop diagnostic logic 33 may be employed by the CP loop diagnostic logic 100. For example, data indicative of the echoes from a signal transmitted across a loop 52, 53 can be analyzed by the loop diagnostic logic 100 to detect an anomaly along the loop 52, 53.

For the purposes of illustration, assume that loop 52 has a loop anomaly that is significantly degraded such that communication between transceivers 62, 72 is disrupted or prevented. In such an example, the CP loop diagnostic logic 100 may perform a loop diagnostic test on the loop 52. In such a situation, the loop diagnostic logic 100 is configured to transmit information indicative of the test results across another loop that is bonded with the defective loop. In the instant example, there is only one other such loop 53, and the loop diagnostic logic 100 transmits the information indicative of the test results, referred to hereafter as "test information," across loop 53. In particular, the loop diagnostic logic 100 transmits the test information to the modem 73. The loop diagnostic logic 100 may be configured to transmit the test information directly to the modem 73 or indirectly (e.g., through the bonding logic 76). The modem 73 modulates a communication signal with the information and transmits the modulated signal across the loop 53 to the modem 63. The modem 63 demodulates the communication signal to recover the test information and transmits the test information to the CO loop diagnostic logic 33 either directly or indirectly (e.g., through the bonding logic 66).

Based on the test information, the CO bonding logic 66 notifies a user of a diagnosed anomaly. Such notification preferably indicates an estimated location of the loop anomaly. For example, the CP loop diagnostic logic 100 may be configured to estimate a location of an anomaly along the loop 52 based on echoes from a signal transmitted across loop 52 or otherwise. The logic 100 may then include, in the test information, a value indicative of the estimated location (e.g., a distance of the detected anomaly from the modem 72.) If the logic 100 is able to determine the type of anomaly detected, the logic 100 may also include, in the test information, data indicative of the detected anomaly type (e.g., whether the anomaly is a degraded splice, a severed loop, etc.). The CO loop diagnostic logic 33 is preferably configured to report the test information to a user, such as an employee of the network service provider responsible for maintaining network 12 (FIG. 1.) For example, the logic 33 may transmit the information to the user output device 47 (FIG. 2) or other user interface to notify a user of the estimated location and possibly type of anomaly detected. Accordingly, based on such information, the user may dispatch a technician to the anomaly location in an effort to repair the anomaly without having to send a technician to the premise of the CP equipment 22.

In another example, the CP loop diagnostic logic 100 does not evaluate the test results but instead records the test results for subsequent evaluation. Moreover, the test information transmitted to the central office 15 does not directly indicate the location of the anomaly but instead includes information indicative of the echo signals (e.g., echo canceler coefficients) that can be analyzed by the CO loop diagnostic logic 33 or otherwise to detect the anomaly and estimate the location of the anomaly.

In one exemplary embodiment, the loop 53 and modems 63, 73 support at least one data channel and a control channel. Further, the test information is transmitted via the control channel so that the testing of the defective loop 52 does not interfere with the data throughput of the data channel or channels on loop 53. However, the test information may be transmitted in one or more data channels, if desired.

In addition, it should be noted that the testing performed by the CP loop diagnostic logic 100 may be initiated by the logic 100 or otherwise, such as by the CO loop diagnostic logic 33. For example, in one exemplary embodiment, the CO loop diagnostic logic 33 is notified when a communication quality parameter, such as signal-to-noise ratio (SNR), indicates that the loop 52 is defective. As a mere example, the modem 62, using known or future-developed techniques, may be configured to determine the SNR for the loop 52. In such an embodiment, the modem 62 is configured to compare the SNR to a predefined threshold. If the SNR is below the threshold, then the modem 62 indicates, to the CO loop diagnostic logic 33, that the loop 52 is defective. In response, the logic 33 initiates a diagnostic test of the loop 52 from the CO end. If the logic 33 is unable to diagnose an anomaly (e.g., determine the anomaly's location), then the logic 33 is configured to transmit, via the control channel of loop 53, a command instructing the CP loop diagnostic logic 100 to initiate a diagnostic test of loop 52 from the CP end. In response, the logic 100 performs the requested test and transmits test information indicative of the test to the CO loop diagnostic logic 33 via the control channel of the loop 53.

The modem 63 may similarly monitor the communication occurring across the loop 53 and notify the CO loop diagnostic logic 33 when a communication quality parameter indicates that the loop 53 is defective. In response, the logic 33 performs a diagnostic test of the loop 53. If the logic 33 performs a diagnostic test of the loop 53 without finding an anomaly, then the logic 33 preferably requests, via the control channel of the loop 52, the CP loop diagnostic logic 100 to perform a diagnostic test of the loop 53 from the CP end of the medium 25. In response, the logic 100 performs the test and transmits test information indicative of such test, via the control channel of the loop 52, to the CO loop diagnostic logic 33. If an anomaly is diagnosed, the logic 33 reports the diagnostic anomaly information to a user.

In another example, the CP loop diagnostic logic 100 may initiate a diagnostic test of the loop 52 without being instructed to do so by the CO loop diagnostic logic 33. For example, the logic 100 may initiate a diagnostic test of the loop 52 when the SNR determined by the CP modem 72 falls below a predefined threshold. The logic 100 may similarly initiate a diagnostic test of the loop based on a communication quality parameter determined by the modem 73. In one embodiment, each modem 72, 73 determines when its respective loop 52, 53 is defective and notifies the logic 100 accordingly. However, the modems 72, 73 may be configured to transmit the communication quality parameter to the logic 100, and the logic 100 may be configured to determine whether the respective loop 52, 53 is defective. Similarly, the CO loop diagnostic logic 33, rather than the CO modems 62, 63 may be configured to determine when a loop 52, 53 is defective and when a loop diagnostic test is, therefore, implemented. Various other techniques for determining when to initiate a diagnostic test and/or report test results are possible.

An exemplary use and operation of the system 10 will be described hereafter with particular reference to FIG. 6.

For illustrative purposes, assume that an anomaly occurs along loop 52 (FIG. 3) close to the customer premises equipment 22 and that the anomaly significantly disrupts communication occurring across the loop 52. For example, a splice may become significantly degraded, or someone might accidentally sever the loop 52. Based on the degraded communication, the CO modem 62 determines that the loop 52 is defective. For example, the CO modem 62 may determine that it can no longer communicate with the CP modem 72, or the CO modem 62 may determine that the SNR for signals communicated across the loop 52 falls below a predefined threshold. Various other techniques for detecting a defective loop are possible. In response to the detection of a defective loop, the CO modem 62 transmits, to the CO loop diagnostic logic 33, an alarm notification indicating that the loop 52 has been identified as defective.

Figure 6:
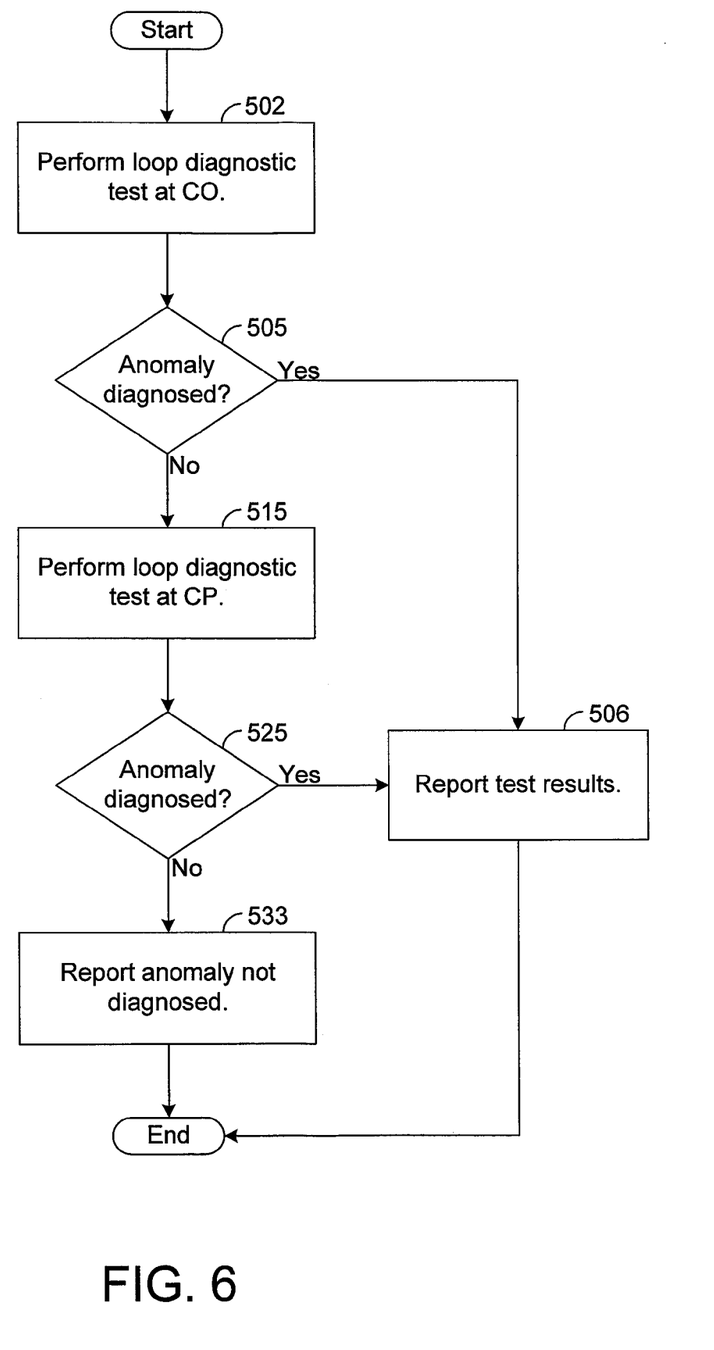
FIG. 6 is a flow chart illustrating an exemplary method for diagnosing and reporting loop anomalies in a communication system, such as is depicted by FIG. 1.

In response to the alarm notification, the loop diagnostic logic 33 performs a loop diagnostic test on the identified loop 52, as shown by block 502 of FIG. 6. In this regard, the CO loop diagnostic logic 33 retrieves data indicative of the echoes for at least one signal transmitted across the defective loop 52 attempts to detect a loop anomaly based on such data. For example, in one exemplary embodiment, the modem 62 employs an echo canceler 64, as shown by FIG. 4. An echo canceler is a known device for canceling echoes present on a telecommunication line. In general, an echo canceler has a plurality of filter coefficients, sometimes referred to as "tap coefficients." Changing conditions on the telecommunication lines affect the echoes received from such lines, and the tap coefficients are repetitively updated based on the echoes. Therefore, the tap coefficients of the echo canceler in the modem 62 are indicative of the current line characteristics of the loop 52. To perform a diagnostic test of the defective loop 52, the CO loop diagnostic logic 66 retrieves the tap coefficients from the echo canceler 64 of the defective loop 52. The logic 33 then analyzes the tap coefficients in an effort to diagnose an anomaly along the loop 52. U.S. Pat. No. 7,174,488; U.S. Pat. No. 7,023,963; U.S. Pat. No. 6,975,706; and U.S. Patent Pub. No. 20050123031 describe exemplary techniques that may be used to diagnose a loop anomaly, but other techniques may be employed in other embodiments.

If the CO loop diagnostic logic 33 diagnoses a loop anomaly, then the logic 33 reports the results of the loop diagnostic test to a user, as shown by blocks 505, 506 of FIG. 6. In this regard, the loop diagnostic logic 33 transmits data that identifies the loop 52 and indicates the location of the detected anomaly along the loop 52 to a user output device 47, which displays the data. Note that the user output device 47 may be located either local or remote relative to the logic 33. For example, the user output device 47 may be a mobile or desk-top device of a technician who is responsible for maintaining the loop 52, and the logic 33 may transmit an email message or some other type of message to the device 47.

As described above, the ability of the loop diagnostic logic 33 to diagnose an anomaly may be dependent on various factors, including the distance of the anomaly from the modem 62. In the instant example, assume that the anomaly is located too far from the modem 62 for the logic 33 to diagnose the anomaly via the loop diagnostic test described above. Thus, the logic 33 makes a "no" determination in block 505.

In response, the CO loop diagnostic logic 33 instructs the CP diagnostic logic 100 to perform a loop diagnostic test on the loop 52, and the CP diagnostic logic then performs a loop diagnostic test as instructed, as shown by block 515 of FIG. 6. In this regard, the CO loop diagnostic logic 33 transmits, to the CO bonding logic 66, a command to perform a loop diagnostic test. In one exemplary embodiment, each loop 52, 53 is associated with an identifier for uniquely identifying the loop relative to other loops of the same communication medium. The command includes the identifier of the loop 52 on which the loop diagnostic test is to be performed. The CO bonding logic 66 transmits the command to the CP equipment 22 via the control channel of the loop 53. In this regard, the bonding logic 66 transmits both data to be communicated via the data channel of the loop 53 and control data to be communicated via the control channel of the loop 53. The control data indicates that a loop diagnostic test is to be performed on the loop 52.

Note that such control data is preferably transmitted via any loop other than one on which the test is to be performed. In the instant example, there are only two loops, and the control data defining the command to perform a diagnostic test on the loop 52 is, therefore, transmitted via loop 53. However, in other examples, the medium 25 may have a greater number of loops, and the command may be transmitted via one or more such loops. In addition, in other examples, the command to perform a loop diagnostic test may be transmitted to the CP equipment 22 via other techniques and/or channels.

The control data transmitted across the loop 53 is eventually received by the CP bonding logic 76. Based on the control data, the CP bonding logic 76 informs the CP loop diagnostic logic 100 that a loop diagnostic test on loop 52 is to be performed. In response, the CP loop diagnostic logic 100 performs a loop diagnostic test on the loop 52 similar to the techniques described above for the CO loop diagnostic logic 33. In this regard, the loop diagnostic logic 100 retrieves data indicative of echoes received from the defective loop 52. For example, in one embodiment, the CP loop diagnostic logic 100 retrieves the current tap coefficients of the echo canceler 74 and analyzes these coefficients in an effort to diagnose an anomaly along the loop 52. U.S. Pat. No. 7,174,488; U.S. Pat. No. 7,023,963; U.S. Pat. No. 6,975,706; and U.S. Patent Pub. No. 20050123031 describe exemplary techniques that may be used to diagnose a loop anomaly, but other techniques may be employed in other embodiments.

The CP loop diagnostic logic 100 then reports the results of the loop diagnostic test to the CO loop diagnostic logic 33 via the control channel or other available channel of the non-defective loop 53. In this regard, the test results can be transmitted to the CO loop diagnostic logic 33 via techniques similar to those described above for transmitting a command from the logic 33 to the CP diagnostic logic 100. Note that, if the CP diagnostic logic 100 has diagnosed a loop anomaly, then the test results preferably include information indicative of the distance of the detected anomaly from the modem 72 or otherwise indicative of the location of the loop anomaly.

Upon receiving the test results from the logic 100, the CO loop diagnostic logic 33 processes the test results in a desired manner. For example, if the CP loop diagnostic logic 100 has successfully diagnosed a loop anomaly, then the logic 33 reports the results of the loop diagnostic test to a user, as shown by blocks 525, 506 of FIG. 6. In this regard, the loop diagnostic logic 33 transmits data that identifies the loop 52 and indicates the location of the detected anomaly along the loop 52 to the user output device 47, which displays the data. However, if the CP loop diagnostic logic 100 was unable to diagnose a loop anomaly, then the logic 33 reports that a loop anomaly diagnostic test was performed on the loop 52 but no anomaly was detected, as shown by block 533 of FIG. 6.

It should be noted that it is unnecessary for the loop diagnostic logic 100 to evaluate the results of the loop diagnostic test that is performed at the CP end of the loop 52. For example, the CP diagnostic logic 100 may perform a loop diagnostic test of the loop 52 and forward the results of such test to the CO loop diagnostic logic 33, which evaluates such results. As a mere example, in the instant embodiment in which the tap coefficients of echo canceler 64 are analyzed to detect a loop anomaly, the CP diagnostic logic 100 may perform a test by retrieving the tap coefficients and transmitting the tap coefficients to the CO loop diagnostic logic 33, which evaluates the tap coefficients in order to determine a location and/or type of a loop anomaly.

In addition, it is also unnecessary for the CP loop diagnostic logic 100 to perform a loop diagnostic test in response to a command from the central office 15. For example, modem 72 may be configured to notify the CP loop diagnostic logic 100 when a communication problem with the loop 52 occurs. In response to such notification, the CP diagnostic logic 100 may perform a loop diagnostic test of the loop 52 and transmit the results of such test to the central office 15 via the loop 53.

Moreover, since the loop anomaly in the instant example is located close to the modem 72, it is likely that the CP loop diagnostic logic 100 could diagnose the loop anomaly even if the CO loop diagnostic logic 33 is unable to diagnose such anomaly by performing a loop diagnostic test at the CO end of the loop 52. Thus, the need of sending a technician to the customer premises in order to manually initiate a loop diagnostic test at the CP end of the loop 52 is obviated.

Now, therefore, the following is claimed:

1. A system, comprising:
   a multi-loop transceiver coupled to a plurality of bonded loops between a network and a customer premises, the plurality of bonded loops including at least a first loop and a second loop, the multi-loop transceiver having bonding logic configured to receive a first data stream and to divide the first data stream for transmission across the plurality of bonded loops such that a first portion of the first data stream is transmitted across the first loop and a second portion of the first data stream is transmitted across the second loop, wherein the bonding logic is configured to receive data from the first loop and data from the second loop and to combine into a second data stream the data from the first loop and the data from the second loop; and
   loop diagnostic logic configured to perform a diagnostic test of the first loop and to transmit information indicative of the diagnostic test across the second loop.

2. The system of claim 1, wherein the multi-loop transceiver comprises an echo canceler for canceling echoes from the first loop, wherein the loop diagnostic logic is configured to locate a loop anomaly of the first loop based on tap coefficients from the echo canceler, and wherein the information is indicative of the location.

3. The system of claim 1, wherein the loop diagnostic logic is configured to determine a location of a loop anomaly along the first loop, wherein the information is indicative of the location.

4. The system of claim 1, wherein the information is indicative of tap coefficients of an echo canceler for canceling echoes from the first loop.

5. The system of claim 1, wherein the information is transmitted via a control channel of the second loop.

6. A system for communicating data across a multi-loop communication medium between a customer premises (CP) and a central office (CO) of a communication network, comprising:
  a first CP modem coupled to a first loop of the multi-loop communication medium;
  a second CP modem coupled to a second loop of the communication medium;
  a first CO modem coupled to the first loop;
  a second CO modem coupled to the second loop;
  CP bonding logic configured to bond the first and second loops at the CP, the CP bonding logic configured to divide a data stream for transmission across the first and second loops such that a first portion of the data stream is transmitted across the first loop and a second portion of the data stream is transmitted across the second loop;
  CO bonding logic configured to bond the first and second loops at the CO, the CO bonding logic configured to receive the first portion from the first loop and the second portion from the second loop, the CO bonding logic further configured to combine the first and second portions thereby recovering the data stream divided by the CP bonding logic; and
  CP loop diagnostic logic configured to perform a diagnostic test of the first loop based on the first CP modem and to transmit information indicative of the diagnostic test to the second CO modem via the second CP modem.

7. The system of claim 6, wherein the first CP modem comprises an echo canceler for canceling echoes from the first loop, and wherein the information is based on tap coefficients of the echo canceler.

8. The system of claim 6, wherein the information is transmitted via a control channel of the second loop.

9. The system of claim 6, further comprising CO loop diagnostic logic configured to perform a diagnostic test of the first loop based on the first CO modem.

10. The system of claim 9, wherein the CO loop diagnostic logic is configured to transmit, to a user output device, information indicative of a location of a loop anomaly along the first loop, wherein the user output device is configured to display the information transmitted by the CO loop diagnostic logic.

11. The system of claim 9, wherein the CP loop diagnostic logic is configured to initiate, in response to a command transmitted from the CO loop diagnostic logic, the diagnostic test of the first loop based on the first CP modem.

12. A system for communicating data across a multi-loop communication medium between a customer premises (CP) and a central office (CO) of a communication network, comprising:
  a first CP modem coupled to a first loop of the multi-loop communication medium;
  a second CP modem coupled to a second loop of the communication medium;
  a first CO modem coupled to the first loop;
  a second CO modem coupled to the second loop;
  CP bonding logic configured to bond the first and second loops at the CP;
  CO bonding logic configured to bond the first and second loops at the CO;
  CP loop diagnostic logic configured to perform a diagnostic test of the first loop based on the first CP modem and to transmit information indicative of the diagnostic test to the CO via the second CP modem; and
  CO loop diagnostic logic configured to perform a diagnostic test of the first loop based on the first CO modem,
  wherein the CP loop diagnostic logic is configured to initiate, in response to a command transmitted from the CO loop diagnostic logic, the diagnostic test of the first loop based on the first CP modem, and wherein the CO loop diagnostic logic is configured to transmit the command after performing the diagnostic test of the first loop based on the first CO modem, if the CO loop diagnostic logic is unable to detect a loop anomaly based on the diagnostic test of the first loop based on the first CO modem.

13. A method for diagnosing loop anomalies on a communication medium having a plurality of bonded loops and connecting a remote site to a central site, comprising the steps of:
  receiving a data stream;
  dividing the data stream into at least a first portion and a second portion for transmission across the plurality of bonded loops;
  transmitting the first portion across a first loop of the plurality of bonded loops;
  transmitting the second portion across a second loop of the plurality of bonded loops;
  receiving the first portion from the first loop;
  receiving the second portion from the second loop;
  recovering the data stream, the recovering step comprising the steps of combining the first portion received from the first loop and the second portion received from the second loop;
  detecting a defective loop among the plurality of bonded loops;
  performing a diagnostic test of the defective loop;
  transmitting the information indicative of the diagnostic test to the central site using at least one non-defective loop of the plurality of bonded loops; and
  diagnosing an anomaly along the defective loop based on the diagnostic test.

14. The method of claim 13, wherein the information is based on the diagnosing step.

15. The method of claim 13, wherein the diagnosing step is based on the information.

16. A method, comprising the steps of:
  communicating data across a plurality of bonded loops between a first multi-loop transceiver and a second multi-loop transceiver, the plurality of bonded loops including at least a first loop and a second loop;
  receiving a data stream;
  dividing the data stream into at least a first portion and a second portion for transmission across the plurality of bonded loops, wherein the communicating step comprises the steps of transmitting the first portion across the first loop and transmitting the second portion across the second loop;
  receiving the first portion from the first loop;
  receiving the second portion from the second loop;
  recovering the data stream, the recovering step comprising the steps of combining the first portion received from the first loop and the second portion received from the second loop;
  performing a diagnostic test of the first loop; and
  transmitting information indicative of the diagnostic test across the second loop.

17. The method of claim 16, wherein the transmitting step comprises the step of transmitting the information via a control channel of the second loop.

18. The method of claim 16, further comprising the step of canceling echoes from the first loop via an echo canceler, wherein the information is based on tap coefficients of the echo canceler.

19. The method of claim 16, further comprising the step of displaying a location of a loop anomaly based on the information.

20. The method of claim 16, further comprising the step of transmitting, across the plurality of bonded loops, a command to perform the diagnostic test, wherein the performing step comprises the step of initiating the diagnostic test in response to the command.

21. The method of claim 20, wherein the first multi-loop transceiver is located at a customer premises (CP) and the second multi-loop transceiver is located at a central office (CO) of a communication network.

22. A method, comprising the steps of:
communicating data across a plurality of bonded loops between a first multi-loop transceiver and a second multi-loop transceiver, the plurality of bonded loops including at least a first loop and a second loop, wherein the first multi-loop transceiver is located at a customer premises (CP) and the second multi-loop transceiver is located at a central office (CO) of a communication network;
performing a diagnostic test of the first loop;
transmitting information indicative of the diagnostic test across the second loop;
transmitting, across the plurality of bonded loops, a command to perform the diagnostic test, wherein the performing step comprises the step of initiating the diagnostic test in response to the command; and
performing a diagnostic test at a CO end of the first loop, wherein the transmitting the command step is performed in response to a determination that a loop anomaly is not detected via the diagnostic test at the CO end of the first loop.

23. A method, comprising the steps of:
communicating data across a plurality of bonded loops between a first multi-loop transceiver and a second multi-loop transceiver, the plurality of bonded loops including at least a first loop and a second loop;
receiving a data stream;
dividing the data stream into at least a first portion and a second portion for transmission across the plurality of bonded loops, wherein the communicating step comprises the steps of transmitting the first portion across the first loop and transmitting the second portion across the second loop;
receiving the first portion from the first loop;
receiving the second portion from the second loop;
recovering the data stream, the recovering step comprising the steps of combining the first portion received from the first loop and the second portion received from the second loop;
receiving echoes from the first loop;
transmitting information based on the echoes across the second loop;
diagnosing a loop anomaly of the first loop based on the echoes; and
indicating a location of the loop anomaly based on the information.

* * * * *